United States Patent [19]
Jones

[11] Patent Number: 5,906,543
[45] Date of Patent: May 25, 1999

[54] LOW OR NO-LASH SLIDER SHAFT FOR A STEERING COLUMN

[75] Inventor: Marc H. Jones, Elberton, Ga.

[73] Assignee: The Torrington Company, Torrington, Conn.

[21] Appl. No.: 08/820,209

[22] Filed: Mar. 18, 1997

[51] Int. Cl.⁶ ....................................................... F16C 3/00
[52] U.S. Cl. ............................................. 464/180; 74/492
[58] Field of Search ..................................... 464/162, 179, 464/180, 181, 183, 78; 74/492; 280/777

[56] References Cited

U.S. PATENT DOCUMENTS

| | | | |
|---|---|---|---|
| 3,714,841 | 2/1973 | Grosseau | 74/492 |
| 3,808,838 | 5/1974 | Bowen et al. | 464/183 |
| 3,844,730 | 10/1974 | Laussermair . | |
| 4,020,651 | 5/1977 | Callies | 74/492 |
| 4,535,645 | 8/1985 | De Bisschop et al. | 464/180 |
| 4,556,400 | 12/1985 | Krude et al. | 464/181 |
| 4,738,011 | 4/1988 | Mori . | |
| 4,805,478 | 2/1989 | Beauch | 74/492 |
| 4,911,034 | 3/1990 | Kulczyk et al. | 464/179 |
| 5,042,153 | 8/1991 | Imao et al. . | |
| 5,086,661 | 2/1992 | Hancock | 74/492 |
| 5,309,620 | 5/1994 | Shinohara et al. . | |
| 5,342,464 | 8/1994 | McIntire et al. . | |
| 5,354,531 | 10/1994 | Gumbert . | |
| 5,383,811 | 1/1995 | Campbell et al. | 464/89 |
| 5,391,113 | 2/1995 | Tanaka | 464/162 |
| 5,501,526 | 3/1996 | Asai et al. . | |
| 5,560,650 | 10/1996 | Woycik et al. | 464/162 |

FOREIGN PATENT DOCUMENTS

| | | | |
|---|---|---|---|
| 58-57518 | 3/1984 | Japan | 464/180 |

*Primary Examiner*—Eileen Dunn Lillis
*Attorney, Agent, or Firm*—Robert F. Palermo

[57] ABSTRACT

A steering column in which a slider shaft is disposed for axial motion within a telescoping tube, a low lash slider shaft is provided including an insert molded of a synthetic material about an end of the slider shaft and at least one longitudinal cut extending substantially radially at least part way through the molded insert into the slider shaft. The cut releases a portion of the shrinkage stresses of the synthetic insert to allow a spring force induced zero clearance between the shaft and the tube.

4 Claims, 2 Drawing Sheets

LOW OR NO-LASH SLIDER SHAFT FOR A STEERING COLUMN

BACKGROUND OF THE INVENTION

This invention relates generally to steering columns and more particularly to steering columns having telescoping steering shafts supported in sleeves.

During operation of motor vehicles, road defects are transmitted through the wheels to the suspension and vehicle chassis as powerful shocks which, if transmitted to the steering wheel and the operator's hands, are objectionable and even harmful. This is addressed by providing a compliant structure, consisting of a slider steering shaft and a supporting sleeve, in the steering column which accommodates the chassis shocks and prevents them from reaching the steering wheel. Clearance is provided between the steering shaft and the supporting sleeve, in order to accommodate telescoping motion between the shaft and sleeve. This clearance results in an objectionable degree of rotational lash between the shaft and sleeve. Lubricant is commonly applied to the members to prevent axial binding. This lubricant fills the clearance when the assembly is new, but during the service life of the assembly, the lubricant is squeezed out of the corners due to the repeated alternating rotations of the shaft. The result is an increase of rotational lash, which is objectionable to the operators of the vehicle in which the steering column is installed.

There are many methods of addressing the rotational lash inherent in such assemblies. These commonly include placing a synthetic bushing or insert between the sliding members. The synthetic insert is lubricious and is far more resistant to the squeezing forces which expel viscous liquid lubricants from the corners. As a result, the increase of rotational lash is delayed and retarded; however, there is still some initial lash, even in well-fitted shaft, insert, and sleeve combinations. Many of such synthetic inserts are molded-in-place on the shaft end, for improved cost and assembly efficiency.

The foregoing illustrates limitations known to exist in present steering columns having telescoping steering shaft and sleeve assemblies. Thus, it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a slider steering shaft for use in a steering column with an axially telescopically supporting tube, comprising a slider steering shaft; an insert of a synthetic material molded-in-place about an end of said slider shaft; and means for imparting a spring-like radial expansion to said molded insert.

The foregoing and other aspects will become apparent from the following detailed description of the invention when considered in conjunction with the accompanying drawings.

DETAILED DESCRIPTION

Figure 1A:
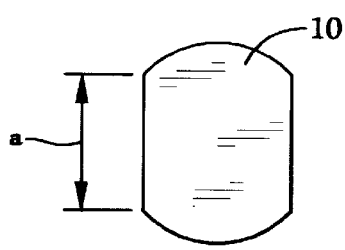
FIGS. 1a and 1b are fragmentary end views of a slider steering shaft and a telescoping sleeve, respectively.
Figure 1B:
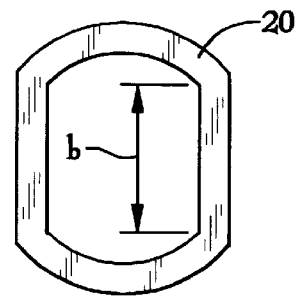
Figure 2A:
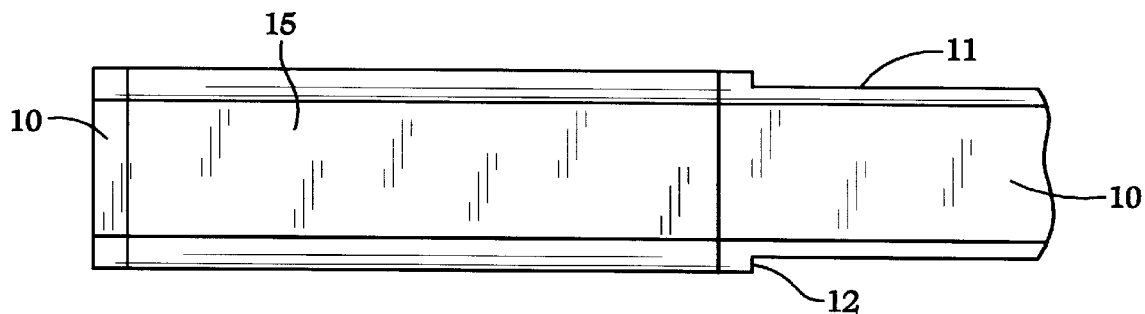
FIGS. 2a and 2b are side views of the shaft and sleeve of FIGS. 1a and 1b.
Figure 2B:
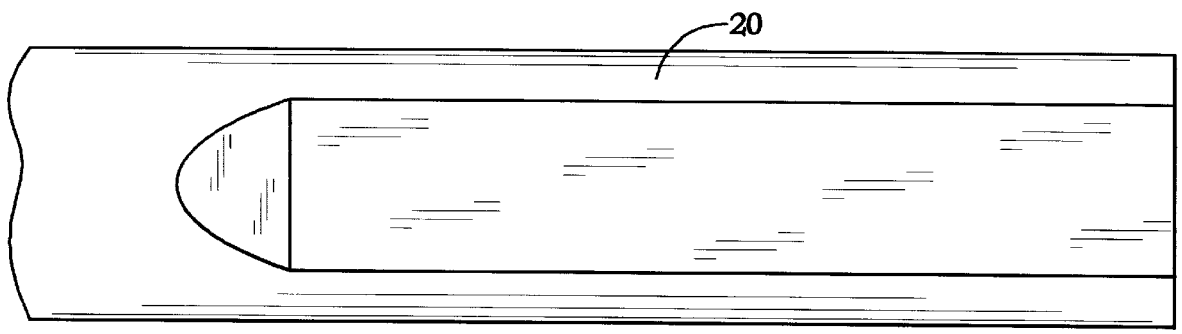

Figs. 1a and 2a and 1b and 2b show end and side views of the slider steering shaft 10 and the sleeve 20, respectively. Shaft 10 and sleeve 20 are each preferably made as cylindrical bodies with two opposing chordal sections, "a" and "b" removed, as shown in FIGS. 1a and 1b. The surface of the solid shaft 10 is congruent with the inner surface of the sleeve 20 such that, being of non-circular cross section, they must rotate together about their common longitudinal axis. Since they are intended to telescope together, there must be some radial clearance between them. The slider shaft 10 may have a flat 11 at its top and bottom, bounded at its forward end by shoulders 12, distal from its telescoping end. A synthetic insert 15 is preferably molded in-place on the telescoping end of the shaft 10. The insert may be of a thermoplastic polymer or other suitable synthetic material.

Figure 3:
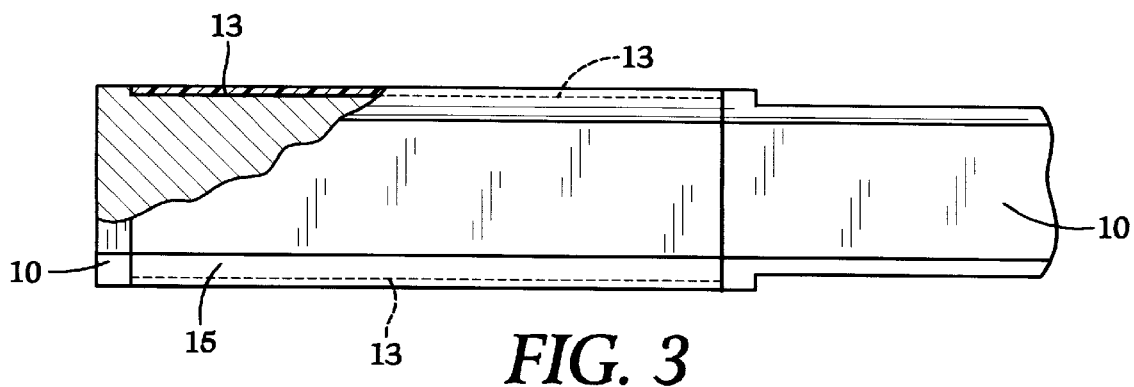
FIG. 3 is a fragmentary partially cut away side view of a slider shaft with a molded in place synthetic insert.

The details of the invention are best illustrated in FIG. 3 in which a side view of the slider steering shaft 10 is shown with a partially cut-away insert 15. Formation of the insert is accomplished by preparing the surface of shaft 10 by making an undercut section, shown as a dotted line in FIG. 3, on the shaft bounded by forward and aft walls 13; clamping the shaft end within a properly sized mold; injecting the synthetic material into the cavity between the inner surface of the mold and the adjacent surface of the shaft 10; and removing the mold. When cooled from the molding temperature, the synthetic insert develops significant hoop stresses, due to differential thermal contraction between the insert and the underlying shaft substrate. Since the thermal expansion (or contraction) coefficient of the synthetic is higher than that of the metal shaft 10, the insert has tensile stresses which are locked in at normal temperatures.

Although the inserts, so molded, have a high degree of dimensional consistency, there are slight deviations of fit between the shaft 10, with the insert 15, and the sleeve 20. These deviations permit rotational lash between the shaft 10 and sleeve 20. In order to reduce or eliminate the objectionable lash, at least one longitudinal cut 16 (see FIGS. 4 and 5) is made through the insert 15 at least part way to the surface of the shaft 10. This cut releases some of the hoop stresses and allows the insert to exhibit spring-like expansive behavior. The result is a reduction or elimination of lash between the two telescoping members. Comparative lash and force-to-slide tests were conducted on twenty (20) standard slider shafts and an equal number of shafts with a single cut through the insert at the one o'clock position. At 10 inch pounds of torque the lash for the standard shaft/insert combination varied between 0.0960 and 0.3490, while at 50 inch pounds the variation was between 0.4410 and 0.6820. For the cut insert tests, the lash varied between 0.0240 and 0.2520, at 10 inch pounds, and between 0.3490 and 0.624, at 50 inch pounds. Force-to-slide values for the normal uncut shafts were between 1.333 pounds and 6.267 pounds. For the cut shafts, the force-to-slide was between 2.133 pounds and 16.900 pounds. Complete data for these tests are shown in Tables 1 and 2.

TABLE 1

ROTATIONAL LASH

| | NORMAL INSERT | | CUT INSERT | | NORMAL VS. CUT | |
|---|---|---|---|---|---|---|
| TEST # | 10"# | 50"# | 10"# | 50"# | 10"# | 50"# |
| 1 | 0.190 | 0.516 | 0.109 | 0.470 | −0.081 | −0.046 |
| 2 | 0.142 | 0.464 | 0.115 | 0.413 | −0.028 | −0.051 |
| 3 | 0.166 | 0.504 | 0.120 | 0.390 | −0.046 | −0.114 |
| 4 | 0.218 | 0.544 | 0.149 | 0.481 | −0.069 | −0.063 |
| 5 | 0.258 | 0.567 | 0.120 | 0.516 | −0.138 | −0.051 |
| 6 | 0.149 | 0.476 | 0.097 | 0.378 | −0.052 | −0.098 |
| 7 | 0.115 | 0.441 | 0.080 | 0.349 | −0.035 | −0.092 |
| 8 | 0.292 | 0.607 | 0.183 | 0.556 | −0.109 | −0.051 |
| 9 | 0.096 | 0.476 | 0.024 | 0.418 | −0.072 | −0.058 |
| 10 | 0.275 | 0.596 | 0.166 | 0.510 | −0.109 | −0.086 |
| 11 | 0.178 | 0.527 | 0.103 | 0.453 | −0.075 | −0.074 |
| 12 | 0.241 | 0.602 | 0.178 | 0.539 | −0.063 | −0.063 |
| 13 | 0.125 | 0.464 | 0.092 | 0.378 | −0.033 | −0.086 |
| 14 | 0.120 | 0.453 | 0.074 | 0.390 | −0.046 | −0.063 |
| 15 | 0.349 | 0.682 | 0.252 | 0.624 | −0.097 | −0.058 |
| 16 | 0.218 | 0.573 | 0.143 | 0.458 | −0.075 | −0.115 |
| 17 | 0.252 | 0.653 | 0.166 | 0.602 | −0.086 | −0.051 |
| 18 | 0.195 | 0.550 | 0.115 | 0.498 | −0.080 | −0.052 |
| 19 | 0.218 | 0.539 | 0.109 | 0.464 | −0.109 | −0.075 |
| 20 | 0.183 | 0.493 | 0.125 | 0.441 | −0.058 | −0.052 |
| AVERAGE CHANGE | | | | | −0.073 | −0.070 |

ALL LASH MEASUREMENTS IN DEGREES (°)

TABLE 2

FORCE TO SLIDE

| TEST # | NORMAL INSERT 3 TRIAL AVG | CUT INSERT 3 TRIAL AVG. | NORMAL VS. CUT CUT AVG − NORMAL AVG. |
|---|---|---|---|
| 1 | 2.467 | 11.600 | 9.133 |
| 2 | 4.400 | 10.600 | 6.200 |
| 3 | 1.933 | 13.667 | 11.733 |
| 4 | 1.867 | 8.400 | 6.533 |
| 5 | 1.867 | 13.133 | 11.267 |
| 6 | 6.067 | 15.800 | 9.733 |
| 7 | 5.467 | 15.333 | 9.867 |
| 8 | 1.933 | 5.933 | 4.000 |
| 9 | 1.667 | 11.867 | 10.200 |
| 10 | 2.133 | 8.000 | 5.867 |
| 11 | 2.933 | 10.400 | 7.467 |
| 12 | 3.267 | 7.133 | 3.867 |
| 13 | 6.200 | 13.933 | 7.733 |
| 14 | 6.267 | 15.067 | 8.800 |
| 15 | 1.333 | 2.133 | 0.800 |
| 16 | 1.600 | 11.133 | 9.533 |
| 17 | 3.533 | 7.200 | 3.667 |
| 18 | 2.333 | 3.800 | 1.467 |
| 19 | 2.067 | 10.000 | 7.933 |
| 20 | 1.333 | 3.867 | 2.533 |
| AVERAGE CHANGE | | | 6.917 |

STANDARD DEVIATION (σ) = 3.188
3 × STD. DEV. (3σ) = 9.565
ALL FORCE TO SLIDE MEASUREMENTS IN POUNDS (#)
SPECIFIED LIMIT OF FORCE TO SLIDE IS 25 POUNDS

Review of the tables indicates the variability of fit between slider shafts 10 with normal inserts 15 and standard sleeves 20. Also they show the significant decrease in lash and the significant increase in force to slide which is afforded by inserts 15 with cuts 16 according to the invention. Ideally, lash would be zero, and force to slide would be minimal; however, due to manufacturing tolerances which must be accommodated, some statistical deviation will always be found. The results of the tests reported above indicate a reduction of variability by the cuts of the invention.

Figure 4A:
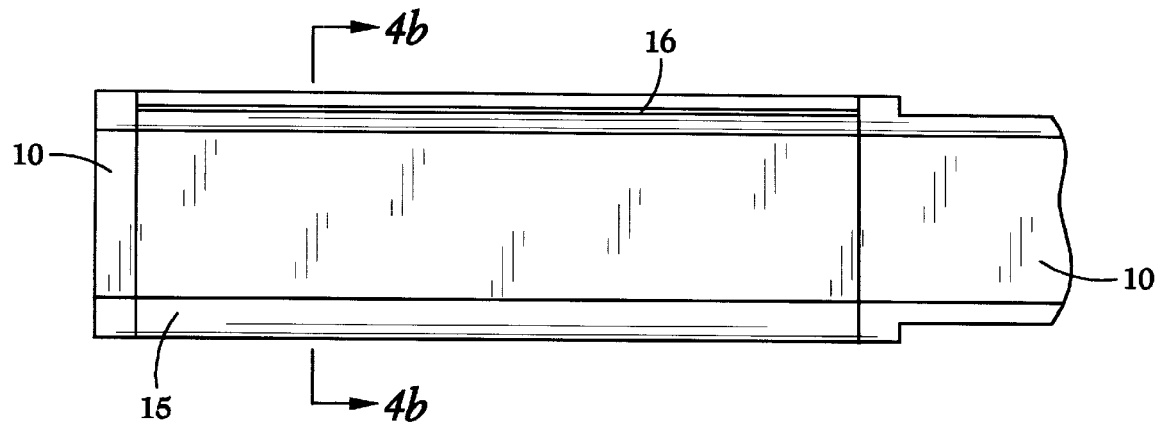
FIG. 4a is a side view of the slider shaft illustrating the insert cut according to one embodiment of the invention.
Figure 4B:
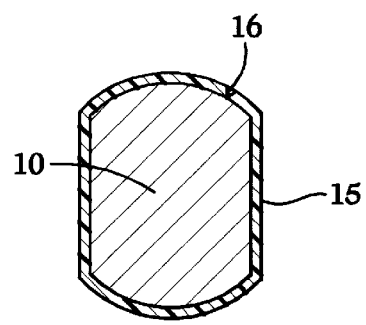
FIG. 4b is a cross-sectional view of the invention taken along line b—b of FIG. 4a and FIG. 5 is a fragmentary side view of the slider shaft partially inserted in the sleeve.
Figure 5:
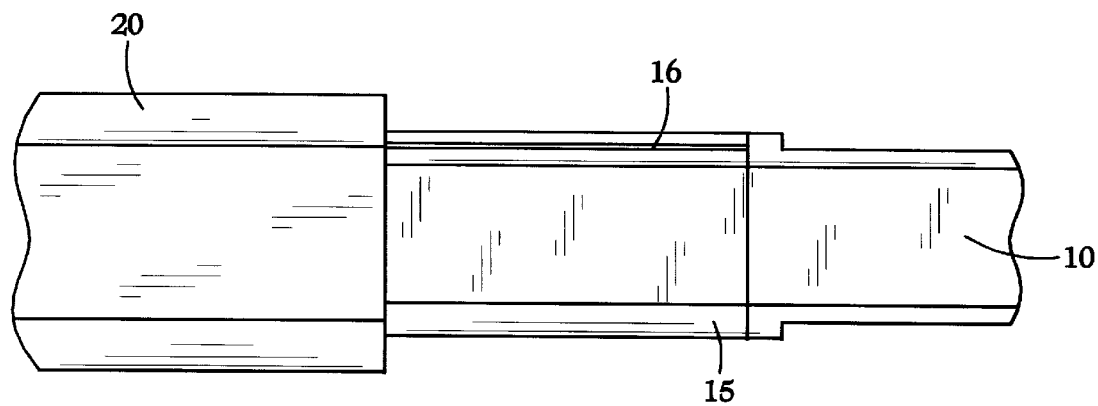

FIGS. 4a, 4b and 5 show a single full-length cut 16, at approximately the 1 o'clock position viewed from the end of the shaft 10, in the insert 15. From a manufacturing cost viewpoint, the single cut is preferred. However, tests were made using two full-length cuts, one each at the 1 o'clock and 7 o'clock positions with equally positive results. Discontinuous cuts of less than full-length were also successfully tested.

Although no tests were conducted on slider shafts with cuts less than the full depth of the insert, it is expected that a similar result would be found, although the changes in lash and force to slide are expected to be less pronounced than they would be with full-penetration cuts. Nevertheless, it is also expected that a greater number of partial penetration cuts can produce the same lash and force to slide reduction as the single full-depth cuts yielded in the above tests.

In summary, molded-in-place inserts on slider shafts used with telescoping sleeves are commonly used in steering columns to reduce rotational lash. Manufacturing tolerance stack-up can lead to an objectionable degree of such lash under some conditions. Using the longitudinal cuts disclosed in this invention can significantly reduce the rotational lash in the as-assembled steering columns.

Having described the invention, I claim:

1. A slider steering shaft for use in a steering column with an axially telescopically supporting tube, comprising:
   a slider steering shaft;
   an insert of a synthetic material molded-in-place about an end of said slider shaft; and
   at least one longitudinal cut extending substantially radially at least part way through said molded insert to release at least a portion of residual hoop stresses in the molded insert and to impart a spring-like radial expansion to said molded insert.

2. The slider steering shaft of claim 1, wherein said at least one longitudinal cut extends substantially the full length of said molded insert.

3. The slider steering shaft of claim 1, wherein said at least one longitudinal cut extends substantially radially through said molded insert to the surface of said slider shaft.

4. The slider steering shaft of claim 3, wherein said at least one longitudinal cut extends substantially the full length of said molded insert.

* * * * *